May 21, 1935.  J. P. FRANK  2,001,779
CASH REGISTER
Original Filed Jan. 23, 1926   2 Sheets-Sheet 1
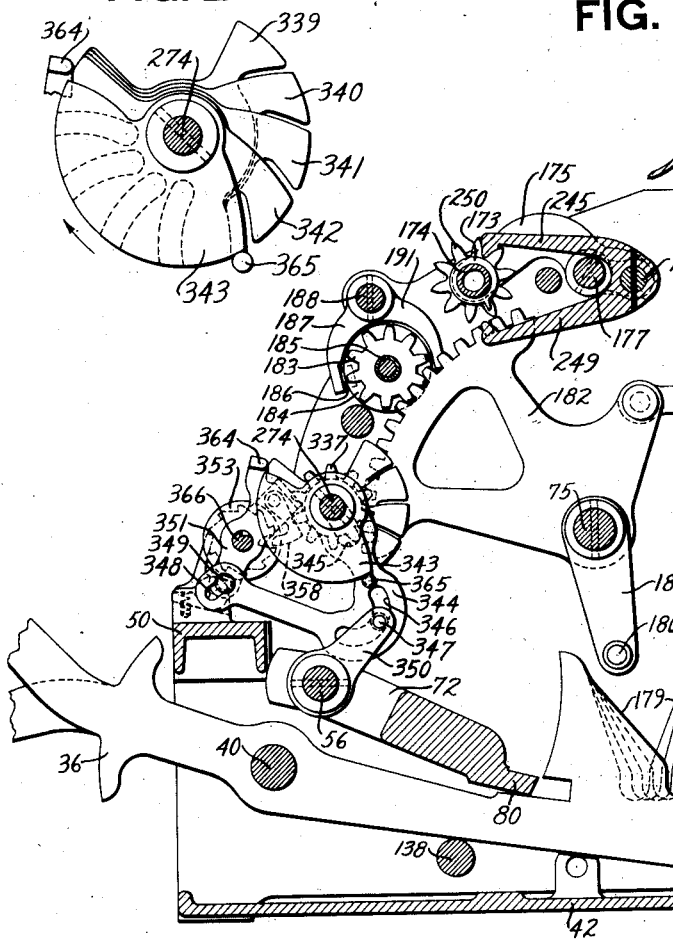
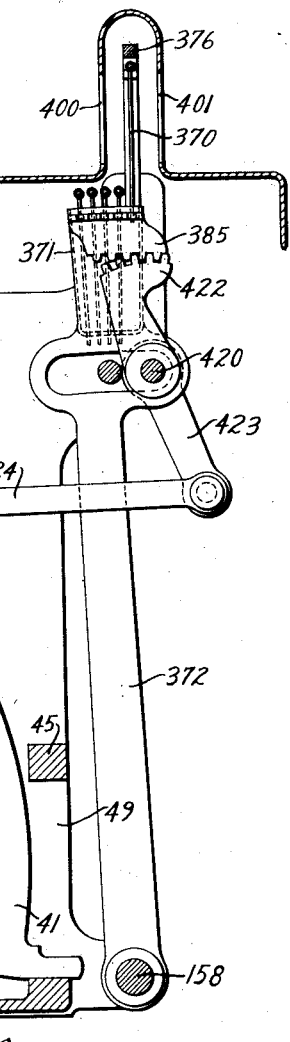
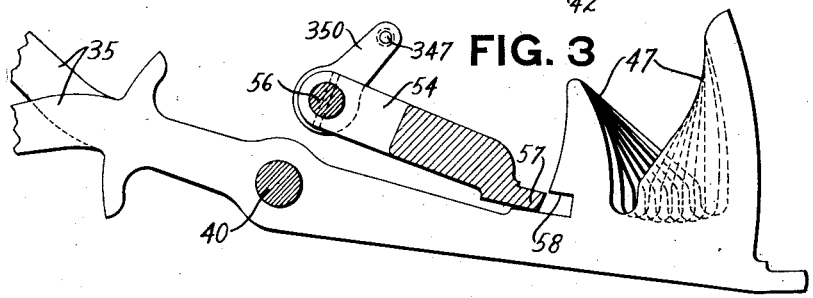
Inventor
John P. Frank
By Carl Beust
His Attorney May 21, 1935.  J. P. FRANK  2,001,779
CASH REGISTER
Original Filed Jan. 23, 1926  2 Sheets-Sheet 2
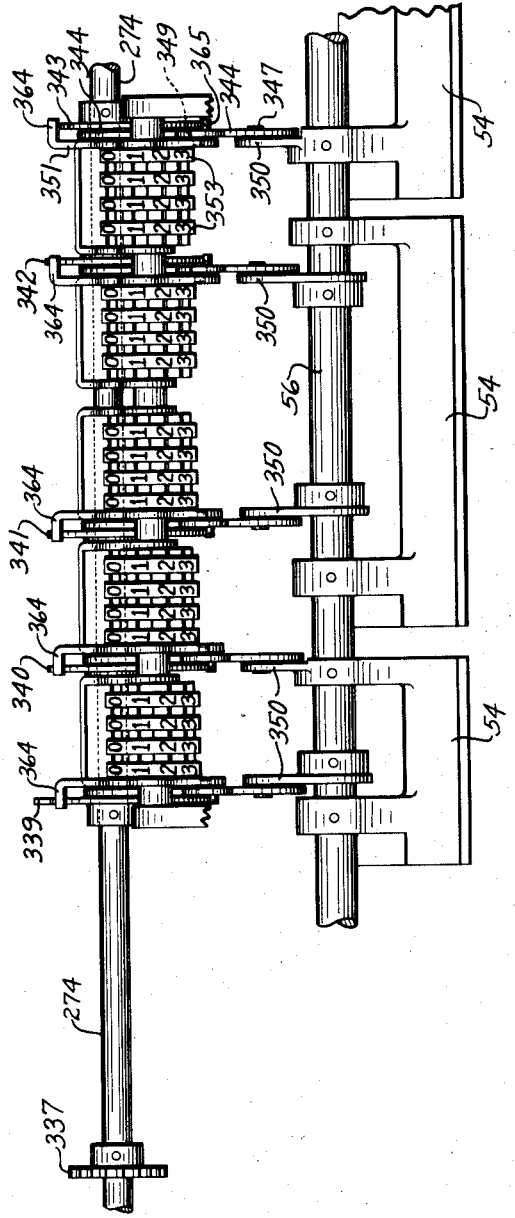
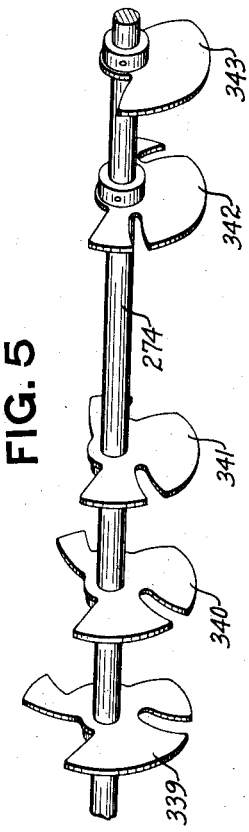
Inventor
John P. Frank
By
His Attorney Patented May 21, 1935

2,001,779

UNITED STATES PATENT OFFICE 2,001,779

CASH REGISTER

John P. Frank, Dayton, Ohio, assignor to The National Cash Register Company, Dayton, Ohio, a corporation of Maryland Original application January 28, 1926, Serial No. 84,350. Divided and this application March 13, 1930, Serial No. 435,456

16 Claims. (Cl. 235—6)

This invention relates to cash registers and like machines, and more particularly refers to counter selecting and operating mechanism, as applied to key-operated registers of the type disclosed in application for Letters Patent of the United States, Serial No. 84,350, filed January 28, 1926, by John P. Frank, which application has issued into Patent No. 1,785,378, on December 16, 1930, of which application the present application is a division.

It is an object of this invention to provide a machine of the type indicated, with a novel counting mechanism for counting the number of transactions of each classification entered into the machine.

Another object is to provide a machine of the type indicated with a novel counter selecting means.

Still another object of the present invention is to provide a machine of the type indicated with novel counter operating means.

With these and incidental objects in view, the invention includes certain novel features of construction and combination of parts, the essential elements of which are set forth in appended claims, and a preferred form or embodiment of which is hereinafter described with reference to the drawings which accompany and form a part of this specification.

In said drawings:

Fig. 1 is a transverse sectional view taken through the machine immediately to the right of the transaction keys.

Fig. 2 is a detail view of the special counter selecting disks.

Fig. 3 is a detail view of a group of amount keys and includes the driving means for the transaction counters.

Fig. 4 is a front elevation of the transaction counters, and the selecting and actuating mechanisms.

Fig. 5 is a perspective view of the selecting disks for the transaction counters.

General description

A brief description in general of the machine of the parent patent, it is believed, will assist in understanding the present invention.

The machine of the parent patent includes a plurality of groups of amount keys to operate the machine to enter items thereinto, a plurality of transaction keys, depression of one of which selects one of a plurality of totalizers with which the machine is provided. A group of keys is provided to operate the machine to take totals and sub-totals from the totalizer selected by depression of the transaction keys.

The machine as disclosed in the parent patent is also provided with a plurality of groups of indicators to indicate to the front and to the rear of the machine the amounts of the items entered into the machine, and the amounts of the totals and sub-totals taken from the totalizers.

A novel differential mechanism is provided to actuate the totalizers and to set the type wheels and indicators differentially under the control of the particular key or keys depressed.

The machine of the parent patent is also provided with a plurality of special step-by-step counters to count the number of times the machine is operated under the control of each of the special transaction keys.

These special counters, and their selecting and operating mechanisms, form the subject matter of the present application.

Detail description

The transaction keys 36 (Fig. 1) are pivoted on a cross rod 40 having its ends supported in a right side frame (not shown) and in a left side frame 49. These side frames are joined at their lower edges by a base 42, by a cross bar 45 at the rear, and by a cross bar 50 at the front of the machine to form a frame framework to support the mechanism of the machine. The enlarged rear end 41 of each of the keys 36 is provided with a differential cam slot 179, which, upon depression of its key, engages a roller 180 on an arm 181, fast on a cross shaft 75, having its ends supported in the machine side frames, and differentially sets the arm 181, and shaft 75, according to the particular key 36 depressed. A setting segment 182 secured to the shaft 75 is likewise differentially set by depression of the transaction keys 36. This segment meshes with a gear 183 secured to the side of a totalizer selecting drum cam 184 with which cooperates a roller 186 carried by an arm 187 of a yoked lever comprising arms 187 and 191 fast on a shaft 188, slidably supported in the side frames of the machine to shift a totalizer shaft longitudinally to select a totalizer for operation. This shaft 188 is connected to a slidable totalizer shaft 174 carried by a pair of arms 175, (only one of which is shown herein), secured to a shaft 177 supported at its ends in the machine side frames.

The mechanism for connecting the totalizer selecting shaft 188 with the totalizer shaft 174, and whereby the movement longitudinally of the machine imparted to the shaft 188 by the rotation of the cam 184 under the influence of its segment 182, is transmitted to the totalizer shaft 174 to select the particular totalizer corresponding to the key 36 depressed, is omitted from this specification and drawings, but is fully disclosed in the parent patent.

A plurality of groups of totalizer wheels 250 are rotatably mounted on the totalizer shaft 174, and totalizer actuators not shown herein, are actuated by the amount keys 35 to accumulate amounts thereon. Forked aliners 245 and 249 fast on a rod 246 carried by rearward projections on the arms 175 are provided to aline the totalizer wheels. The aliner 245 maintains the totalizer wheels 250 in alinement when disengaged from their actuators, and the aliner 249 maintains those totalizer wheels not selected for entries, in alinement while the selected totalizer wheels are in engagement with the actuators. This is set forth in detail in the above-named parent patent.

To set the indicators, a link 424 connects the segment 182 with an arm 423 fast on a shaft 420 supported in the machine side frames, on which shaft is also secured a segment gear 422 meshing with a rack 385 secured to the side of an indicator holder 371 supported in a pair of rocking arms 372 (only one of which is shown herein) pivoted on a shaft 158 supported in the machine side frames. The differential adjustment of the segment 182 is transmitted to the segment 422 by the link 424, arm 423 and shaft 420, to differentially rock this segment, thereby selecting the indicator corresponding to the particular key depressed. The selected indicator is then raised by a bar 376 with which the indicator is adapted to cooperate. Any suitable means, preferably of the type disclosed in the parent patent, may be used to raise and lower the bar 376.

The foregoing mechanisms are the subject of invention disclosed in the parent patent referred to above, and only form a part of the present invention when combined with new and useful mechanism now to be described.

*Special counters*

A special counter is provided for each transaction key 36. As pointed out in the parent patent, there are five transaction keys, namely, "cash", "charge", "received-on-account", "paid out", and "no sale". As is well known, in the operation of machines of the class disclosed herein, a special key is depressed first, followed by the depression of an amount key. Depression of a transaction key 36 selects the special counter to be operated, and the subsequent depression of an amount key 35, actuates the operating connections for the selected counter to add "one" therein.

Depression of any transaction key 36, except the "no sale" key, adjusts the segment 182 through differential slots 179, cooperating with the roller 180 on arm 181 to select a counter for actuation. The segment 182 meshes with a gear 337 (Figs. 1 and 4) fast on a shaft 274 rotatably mounted in the side frames of the machine. A series of five disks 339, 340, 341, 342 and 343, (see also Figs. 2 and 5) one for each counter, are secured to the shaft 274, and are differentially rotated according to the particular key 36 depressed. Each of these disks cooperates with a corresponding ear 364 on a counter operating lever 351 pivoted on a counter shaft 366, and with a stud 365 projecting from a pitman 344 to determine which one of the special counters is to be operated. There is an arm 350, a lever 351 and a pitman 344 for each counter cooperating with each disk 339 to 343.

The operating mechanisms for all of the special counters are alike, therefore, only one operating mechanism is described in detail. It is to be understood that the remaining four mechanisms are identical in all respects, except that the control disks differ from each other in order to permit selection of any desired counter.

A slot 345 (Fig. 1) in the pitman 344 surrounds the shaft 274, and a slot 348 in the opposite end of the pitman 344 surrounds a stud 349 projecting from the lower arm of the lever 351. The other arm of the lever 351 carries a tined pawl 358 cooperating with ratchets secured to the sides of counter wheels 353 rotatably mounted on the shaft 366. A stud 347 on an arm 350 extending upwardly from a key coupler shaft 56 projects into a curved slot 346 in the pitman 344.

After the disks 339 to 343 inclusive are differentally set by the segment 182 under the control of the particular transaction key 36 depressed, an amount key 35 (Fig. 3) is operated to enter an amount into the machine.

Each bank of amount keys 35 are associated with a key coupler 54 (Figs. 3 and 4) fast on the shaft 56, and depression of one of the keys 35 rocks the key couplers 54 counter-clockwise, rocking the shaft 56 and the arms 350 (Figs. 1 and 4) counter-clockwise at the same time. A key coupler 72 is actuated by the transaction keys 36, but this key coupler is loose on the shaft 56, and therefore, does not operate the shaft 56 or arms 350. The key coupler 72 has no function in this application other than to restore the special transaction keys to normal position.

The disk 343 is the controlling disk for the "no sale" counter, and is normally in position to cause "one" to be added into such "no sale" counter. The "no sale" key does not adjust the segment 182, and therefore, upon depression of the "no sale" key the disk 343 remains in the position shown in the drawings.

Assuming that the "no sale" key has been depressed and the arms 350 are actuated by the subsequent depression of an amount key 35, the operation of the mechanism will be as follows.

When the arm 350, associated with the "no sale" counter, is rocked counter-clockwise by the key coupler 54, the stud 347 thrusts the pitman 344 toward the left, and as the stud 365 thereon is in contact with the disk 343 the pitman is rocked counter-clockwise about the shaft 274 as a fulcrum. This movement, due to the pin and slot connection 348 and 349, rocks the counter operating lever 351 clockwise to advance the counter wheel 353 of lowest order one step of movement. The remainder of the pitmen 344 pivot on their studs 349 due to the fact that the remainder of the disks, present their peripheries to the ears 364, thereby holding the levers 351 associated therewith against clockwise rotation, and preventing operation of the special counters associated with the undepressed transaction keys.

The operating mechanism for each of the "cash", "charge", "received-on-account" and "paid out" counters is similar to that of the "no sale" counter operating mechanism shown in Fig. 1. Each lever 351 is provided with an ear 364, extending laterally into the plane of its respective disk 339, 340, 341 or 342. Each pitman 344 is provided with a pin 365 which projects laterally into the plane of its respective disk. The disks 339 to 343 are selectively adjusted by the transaction keys to position a recessed section of the disk for the selected counter into the path of the ear 364 on the lever 354 to permit the ear to move unobstructed. While one counter is being operated, the other counters are disabled by the relative positions of the disks 359 to 346 to the pins 365 and ears 364. The disks are so arranged that all the ears 364, except the one corresponding to the selected counter, engage the peripheries of their respective disks; and all the pins 365, except the one corresponding to the selected counter, enter recesses in the disks. The pitmen 344 corresponding to the counters not selected are then moved counter-clockwise by arms 350 and studs 347, with the studs 349 acting as their pivots, and therefore, the arms 351 for the counters not selected remain stationary and nothing is added into such counters.

From the above it is clear that the primary purpose of the pins 365 is to cause the selected counter actuating means 344—351 to add one into its counter; and the primary purpose of the ears 364 is to prevent addition of one into the counters not selected. Thus the studs 365 provide means to determine when the actuating means is to be effective and the ears 364 provide means to determine when the actuating means is to be ineffective.

When the amount key, after having been fully depressed, is released, its key coupler 54 restores it to normal position, rocking the shaft 56 and arm 350 clockwise restoring all of the pitmen 344 to their normal positions.

The pitman 344 associated with the selected counter pivots on the shaft 274, and by the clockwise movement of the arm 350 is rocked counter-clockwise about the shaft 274, rocking the lever 351 counter-clockwise about its pivot 366 retracting the pawl 358 preparatory to another operation of the machine. Those pitmen 344 associated with the special counters not selected pivot on their studs 349 and are rocked clockwise by the restoring movement of the key coupler 54 and arm 350, the pitmen moving idly over the shaft 274.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of lever keys, an actuating member adapted to be differentially operated by said keys, a plurality of rotatable members operated by said actuating member, a plurality of counting devices appropriate to said lever keys, and a plurality of counting device actuating means selectively operated under control of said rotatable members.

2. In a machine of the class described, the combination of a plurality of lever keys, an actuating member differentially operated by said keys, a plurality of laterally spaced rotatable members operated by said actuating member, a plurality of counting devices adapted to count the number of operations of said lever keys, means for actuating said counting devices, and means cooperating with said rotatable members for selectively controlling the effectiveness of said counting device actuating means.

3. In a machine of the class described, the combination of a plurality of lever keys, an actuating member differentially operated by said keys, a plurality of laterally spaced rotatable members operated by said actuating member, a plurality of counting devices adapted to count the number of operations of said lever keys, means for actuating said counting devices, and means cooperating with said rotatable members whereby one counting device actuating member will be effective and the others ineffective.

4. In a machine of the class described, the combination of a plurality of counting devices, separate actuating means for each counting device, and a unitary device including a differentially adjustable shaft and disks secured to said shaft, the disks provided with high and low places for preventing operation of all but one of said actuating means as determined by the differential adjustment of the said shaft.

5. In a machine of the class described, in combination with a plurality of counters; and separate actuating means for each counter; of a plurality of mutilated disks to select a counter for operation; a common drive for all the counters; connections between the separate actuating means and common drive; a projection on each connection adapted to cooperate with its respective mutilated disk to cause its counter to be operated; and a projection on each actuating means adapted to cooperate with its respective mutilated disk to prevent operation of its counter.

6. In a machine of the class described, in combination with a plurality of counters; and separate actuating means for each counter; of a plurality of mutilated disks; means on each actuating means adapted to be selectively engaged by the mutilated disks to prevent movement of the actuating means; a common drive for all the actuating means; connections between the actuating means and the common driver adapted to move in one direction to actuate a selected counter, and in another direction when the actuating means is held against movement, said connections all operable during every operation of the machine in one of their directions as controlled by the mutilated disks.

7. In a machine of the class described, in combination with a plurality of counters; and separate actuating means for each counter; of a plurality of mutilated disks; means on each actuating means cooperating with the disks to render the actuating means inactive; a common drive for all the actuating means; a pitman to connect each actuating means with the common drive, said pitman operable in one direction to add into the counter and in another direction when the actuating means is rendered inactive; a pin and slot connection between the common drive and each pitman to move the respective pitmen in one of two directions while the common driver is moved in a certain direction.

8. In a machine of the class described, the combination of a plurality of counters, operating means therefor, mutilated disks to determine the effectiveness of the operating means, and means to differentially position all the disks during each operation of the machine to select one counter for operation.

9. In a machine of the class described, the combination of a plurality of counters, operating means for each counter, and rotatable mutilated disks radially offset, coacting with the operating means to select only one counter for operation during each operation of the machine.

10. In a machine of the class described, the combination of a plurality of counters, operating means for each counter, a differentially positionable shaft, and mutilated disks secured to the shaft and coacting with the operating means to select a certain counter for each position of the shaft.

11. In a machine of the class described, the combination of a plurality of counters, separate actuating means for each counter, and a plurality of disks having high and low places coacting with the operating means to select only one counter for each operation of the machine.

12. In a machine of the class described, the combination of a plurality of counters, separate actuating means for each counter, a differentially settable shaft, and disks coacting with the actuating means, said disks secured to the shaft to form a unitary member and provided with high and low places to select only one of the actuating means as determined by the differential setting of the shaft.

13. In a machine of the class described, the combination of a plurality of counters, a separate actuating means for each counter, a differentially settable shaft, disks secured to the shaft, said disks having high and low places, and a feeler associated with each actuating means and adapted to cooperate with the disks to render the actuating means effective.

14. In a machine of the class described, the combination of a plurality of counters, a separate actuating means for each counter, mutilated disks all of which are differentially settable during every operation of the machine, a feeler intermediate each disk and actuating means arranged to cooperate with its associated disk during every operation of the machine to determine when the actuating means is to be effective.

15. In a machine of the class described, the combination of a plurality of counters, a separate actuating means for each counter, mutilated disks to cooperate with the actuating means, all of which disks are differentially settable during every operation of the machine to select one of the actuating means, and a single driving means to operate any selected actuating means.

16. In a machine of the class described, the combination of a plurality of counters, a separate actuating means for each counter, a mutilated disk associated with each actuating means, all of the disks adjustable like extents during each operation of the machine, and a projection on one element of each actuating means to cooperate with its associated mutilated disk to determine when the associated actuating means is to be effective.

JOHN P. FRANK.

CERTIFICATE OF CORRECTION.

Patent No. 2,001,779.  May 21, 1935.

JOHN P. FRANK.

It is hereby certified that error appears in the above numbered patent requiring correction as follows: In the grant, lines 3 and 14, the name of the assignee should read The National Cash Register Company, instead of "National Cash Register Company"; and that the said Letters Patent should be read with this correction therein that the same may conform to the record of the case in the Patent Office.

Signed and sealed this 16th day of July, A. D. 1935.

Leslie Frazer

Acting Commissioner of Patents.

(Seal)